US006422726B1

(12) United States Patent
Tatsukawa et al.

(10) Patent No.: US 6,422,726 B1
(45) Date of Patent: Jul. 23, 2002

(54) VEHICLE HEADLAMP

(75) Inventors: Masashi Tatsukawa; Naruhiro Michiba, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/658,225

(22) Filed: Sep. 8, 2000

(30) Foreign Application Priority Data

Sep. 17, 1999 (JP) ........................................ 11-263287

(51) Int. Cl.[7] ............................................... B60Q 1/04

(52) U.S. Cl. ..................... 362/517; 362/539; 362/351; 362/309; 362/299; 362/300

(58) Field of Search ............................... 362/351, 517, 362/346, 297, 298, 299, 300, 301, 302, 303, 304, 539, 308, 309

(56) References Cited

U.S. PATENT DOCUMENTS 5,111,368 A 5/1992 Suzuki et al.
5,130,900 A 7/1992 Makita
5,430,623 A 7/1995 Uchida
6,050,706 A * 4/2000 Ohtuka et al. .............. 362/521
6,079,860 A * 6/2000 Ito ............................ 362/351
6,132,068 A * 10/2000 Katsumata .................. 362/351

OTHER PUBLICATIONS

Webster II New Riverside University Dictionary, copyright 1984, Riverside publishing company, p. 314.*

* cited by examiner

*Primary Examiner*—Thomas M. Sember
(74) *Attorney, Agent, or Firm*—Koda & Androlia

(57) ABSTRACT

A vehicle headlamp including a light source bulb installed on an optical axis that extends in a longitudinal direction of a vehicle, a reflector having a reflective surface for reflecting a light from the light source bulb forward, and a shade for blocking part of a light directly irradiated from the light source bulb. Still further, the shade is comprised of a shade body that surrounds a front-end portion of the light source bulb around the optical axis and a mount stay that supports the shade body and an outer circumferential surface of the shade body is provided with a corrugated diffusion portion formed thereon so as to diffusely reflect a light admitted thereto.

6 Claims, 6 Drawing Sheets

VEHICLE HEADLAMP

BACKGROUND OF THE INVENTION

1. Field of the Invention

The present invention relates to a vehicle headlamp and more particularly to a shade that is installed in the vehicle headlamp.

2. Prior Art

Recently, an increasing number of vehicle headlamps are provided with a shade so that the driver of an oncoming vehicle or a pedestrian is not blinded by glare.

FIG. 5 shows the typical conventional shade structure.

The shade 2 is composed of a shade body 2A and a mount stay 2B. The shade body 2A surrounds the front end of a light source bulb 4 around an optical axis Ax1 like a cylinder, and the mount stay 2B supports the shade body 2A by being fixed to a reflector 6. The shade body 2A allows the incidence of only the direct light irradiated from the light source bulb 4 toward a reflective surface 6*a* of a reflector 6. The shade body 2A shades the light rays that might cause glare that includes, for example, a direct light irradiated upward in the forward direction from the light source bulb 4 and a direct light admitted onto the upper wall surface 6*b* of the reflector 6.

The rear expansion angle 2 that is broadened rearward relative to the optical axis Ax of the shade body 2A of the shade 2 is set to be a larger value (about 10° or greater). If the rear expansion angle 2 is set to be a smaller value as shown in FIG. 6, some of the light reflecting from the reflective surface 6*a* of the reflector 6 is admitted onto the upper outer circumferential surface 2A*a* of the shade body 2A. Such reflected light may cause the light B2 directed upward to be irradiated to the fore of the lamp unit, thus generating glare.

The above-described setting of the rear expansion angle of FIG. 5 is made to prevent generation of the glare.

If the rear expansion angle 2 of the shade body 2A is set to be a large value as in FIG. 5, the light from the light source bulb 4 reflects off of the upper inner circumferential surface 2A*b* of the shade body 2A and admitted onto the lower area of the reflective surface 6*a* of the reflector 6 as shown by the chain double-dashed line in FIG. 5. The resultant reflected light causes the light B1 that is directed upward, which causes the glare, to be irradiated to the fore of the lamp unit.

One solution to overcome the above problems is to coat the inner surface of the shade body 2A with black paint so as to eliminate the reflection by the upper inner circumferential surface 2A*b*, thus preventing the irradiation of the upwardly directed light B1 to the fore of the lamp unit. The application of this black paint coating, however, creates another problem. It increases the manufacturing cost of the shade.

Moreover, in the shade 2 above, the rear expansion angle 2 of the shade body 2A has to be set to a substantially large value. However, this structure would restrict the degree of freedom in designing the shape of the shade.

SUMMARY OF THE INVENTION

In view of the above, the object of the present invention is to provide a vehicle headlamp having a shade, in which the cost of the shade can be reduced and the degree of freedom in the shaping thereof can be improved.

So as to accomplish the object, the present invention provides a novel surface shape for the shade.

More specifically, the present invention is for a vehicle headlamp that includes a light source bulb installed on an optical axis that extends in the longitudinal direction of the vehicle, a reflector having a reflective surface for reflecting the light from the light source bulb forward, and a shade for blocking some of the light directly irradiated from the light source bulb; and in the present invention, the shade is comprised of a shade body and a mount stay, the shade body surrounding the front-end portion of the light source bulb around the optical axis like a cylinder, and the mount stay supporting the shade body; and the outer circumferential surface of the shade body has a corrugated diffusion portion so as to diffusely reflect the light admitted thereto.

The "shade body" is formed of only a cylinder-like portion that surrounds the front end of the light source bulb around the optical axis like a cylinder. Alternatively, it can be formed in a cap-like shape so as to block the front end of the cylinder-like portion.

The "upper outer circumferential surface" refers to the outer circumferential surface of the upper portion of the shade body. The "upper portion of the shade body" designates the area that crosses over left and right from a position directly above the optical axis of the shade body. The area of the upper portion of the shade body is not particularly limited to be a certain range.

The configuration, size or the like of the above-described "corrugated diffusion portion" are not particularly limited as long as it has a plurality of repeating concave and convex portions to cause the light admitted onto the upper outer circumferential surface of the shade body to be diffusely reflected. In other words, the corrugated diffusion portion has a configuration of, for instance, a wave-like corrugated surface, mesh-like corrugated surface, dot-like corrugated surface, mat-like corrugated surface and the like.

The vehicle headlamp of the present invention is provided with a shade that blocks some of the direct light irradiated from the light source bulb. The shade body of the shade surrounds the front end of the light source bulb like a cylinder. The corrugated diffusion portion is formed on the upper outer circumferential surface of the shade body so that the light admitted onto the upper outer circumferential surface is diffusely reflected. Because of this structure, the following advantageous effect can be obtained.

Even if some of the light reflected from the reflective surface of the reflector is admitted onto the upper outer circumferential surface of the shade body, the light reflected therefrom becomes a diffused light by the diffusion reflection function of the corrugated diffusion portion. As a result, the light directed upward which is irradiated to the fore of the lamp unit can be lowered in its intensity to a substantially small value, thus eliminating the glare.

Although some of the light reflected from the reflective surface of the reflector is admitted onto the upper outer circumferential surface of the shade body, no glare is likely to occur. Therefore, the rear expansion angle of the shade body does not have to be set to a larger value as in the case of the prior art, thus enhancing the degree of freedom in shaping the shade.

In the present invention, the rear expansion angle of the shade body is set to be a small value. The shade is thus shaped so that the light from the light source bulb reflected from the upper inner circumferential surface of the shade body is not admitted onto the lower area of the reflective surface of the reflector (to minimize the quantity of light) Accordingly, the generation of glare due to the light reflecting off of the inner surface of the shade can be preliminarily prevented without applying a black paint coating to the inner surface of the shade body. The cost of the shade thus can be reduced by the amount corresponding to the cost that can be saved by eliminating the process for applying the black paint coating.

As seen from the above, the present invention provides a vehicle headlamp provided with a shade, in which the cost for the shade is reduced, and the degree of freedom in shaping the shade is improved.

In the above-described structure, it is possible to set the rear expansion angle of the shade body to be constant over the entire circumferential area. It is also possible to set the rear expansion angle differently at each position in the circumferential direction. In this case, it is preferable that the upper portion of the shade body is formed at a rear expansion angle of 7° or less with respect to the optical axis. By way of this, incidence of the light reflecting from the upper inner circumferential surface of the shade body onto the lower area of the reflective surface of the reflector can be more effectively prevented.

It can be clearly understood that the structure of the "corrugated diffusion portion" is not particularly limited. The sectional shape of the corrugated diffused portion that is perpendicular to the optical axis can be a longitudinally striped wave-like surface. With this longitudinally striped wave-like surface, the corrugated diffused portion can be formed without deteriorating its moldability in case the shade is formed by press molding a plate material. In case where a plurality of reflecting elements constitute the reflective surface of the reflector, the design of the reflecting elements can be easily matched with the design of the corrugated diffused portion.

By forming the corrugated diffused portion as a longitudinally striped wave-like surface, the upper inner circumferential surface of the shade body can be easily formed so as to have the longitudinally striped wave-like surface. With this structure, the light reflected from the upper inner circumferential surface could be formed into diffusely reflected light. Even if the rear expansion angle of the shade body is set to a large value, the black paint coating can be eliminated. In other words, the light from the light source bulb admitted to the upper inner circumferential surface of the shade body is admitted to the lower area of the reflective surface of the reflector as a diffusely reflected light. Therefore, the light directed upward to be irradiated to the fore of the lamp unit from the lower area can be reduced in its intensity to a substantially small value so as not to glare. It is thus possible to prevent a generation of glare that results from the light reflecting from the inner surface of the shade without applying a black paint coating thereto.

In the present invention, the structure of the reflective surface of the reflector is not particularly limited. The reflector may be formed so as to have a single curved surface like a paraboloid of revolution or the like. Alternatively, it may have a plurality of reflecting elements. In the latter case, the design of the lamp unit can be further unified by forming the surface configuration of the area above the optical axis on the reflective surface of the reflector to have a substantially identical configuration to that of the corrugated diffused portion. The term "the area above the optical axis" refers to the area that crosses over left and right from a position directly above the optical axis on the reflective surface of the reflector. The angle of this area is not particularly restricted to be in the particular range.

DETAILED DESCRIPTION OF THE PREFERRED EMBODIMENTS

An embodiment of the present invention will hereinafter be described with reference to the accompanying drawings.

Figure 1:
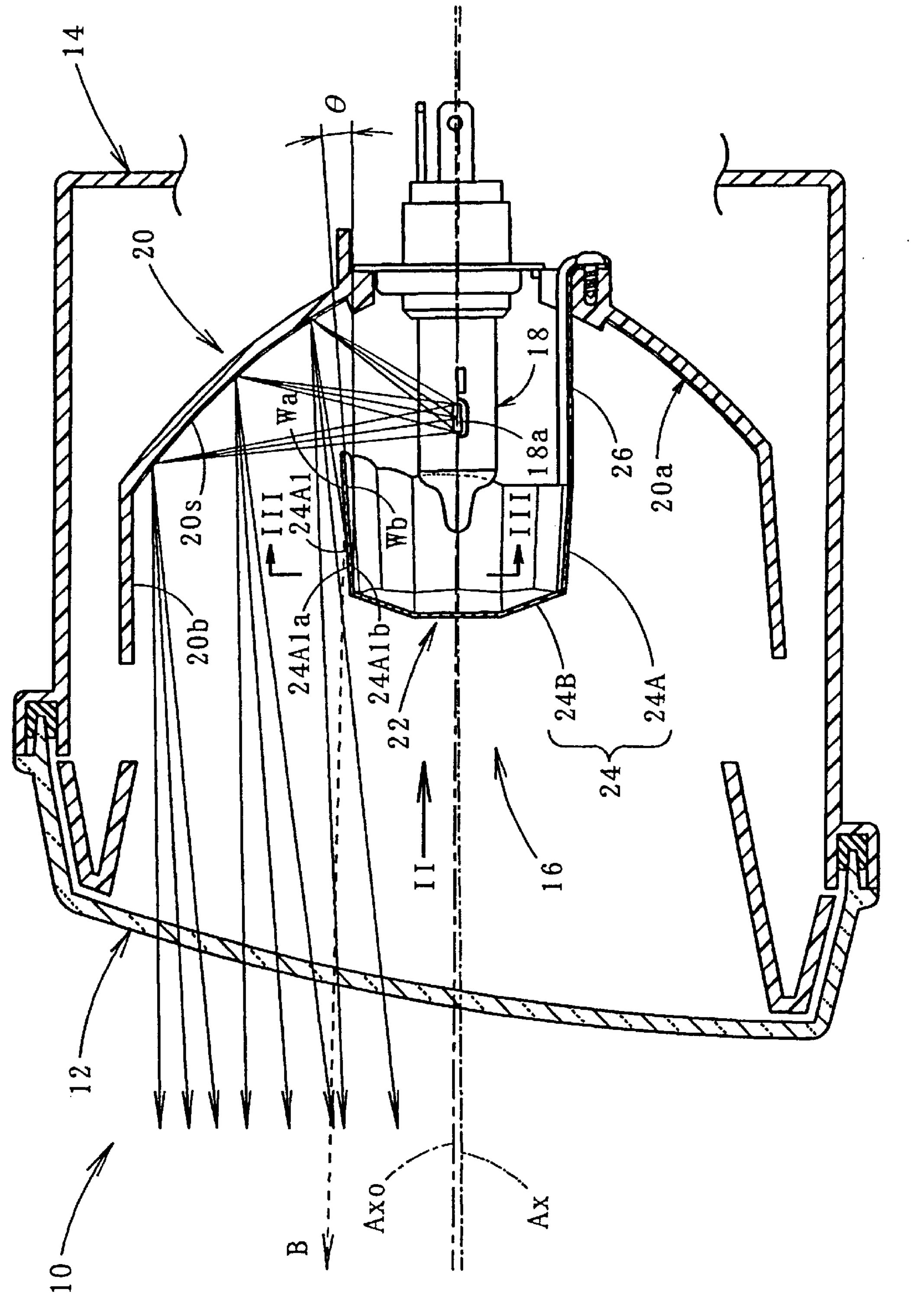
FIG. 1 is a sectional side elevational view of the vehicle headlamp according to one embodiment of the present invention.

Referring to FIG. 1, a vehicle headlamp 10 has a reflector unit 16 that can tilt in vertical and horizontal directions within a lamp chamber defined by a lens 12 and a lamp body 14.

The reflector unit 16 is composed of a light source bulb 18, a reflector 20 and a shade 22. The optical axis Ax of the reflector unit 16 is adjusted to be slightly downward (at an angle of approximately 0.6°) with respect to the lamp unit reference axis Axo that extends in the longitudinal direction of the vehicle (not show) that is mounted with the headlamp 10.

The light source bulb 18 is an H4 type halogen bulb. The bulb 18 is inserted into the rear-end portion of the reflector 20 so that a filament 18*a* for the low beam is located at a predetermined position on the optical axis Ax.

The reflector 20 is provided with a reflective surface 20*a* that has a plurality of reflecting elements 20*s* (see also FIG. 2) formed on the paraboloidal surface of revolution with the optical axis Ax as the center axis.

Figure 2:
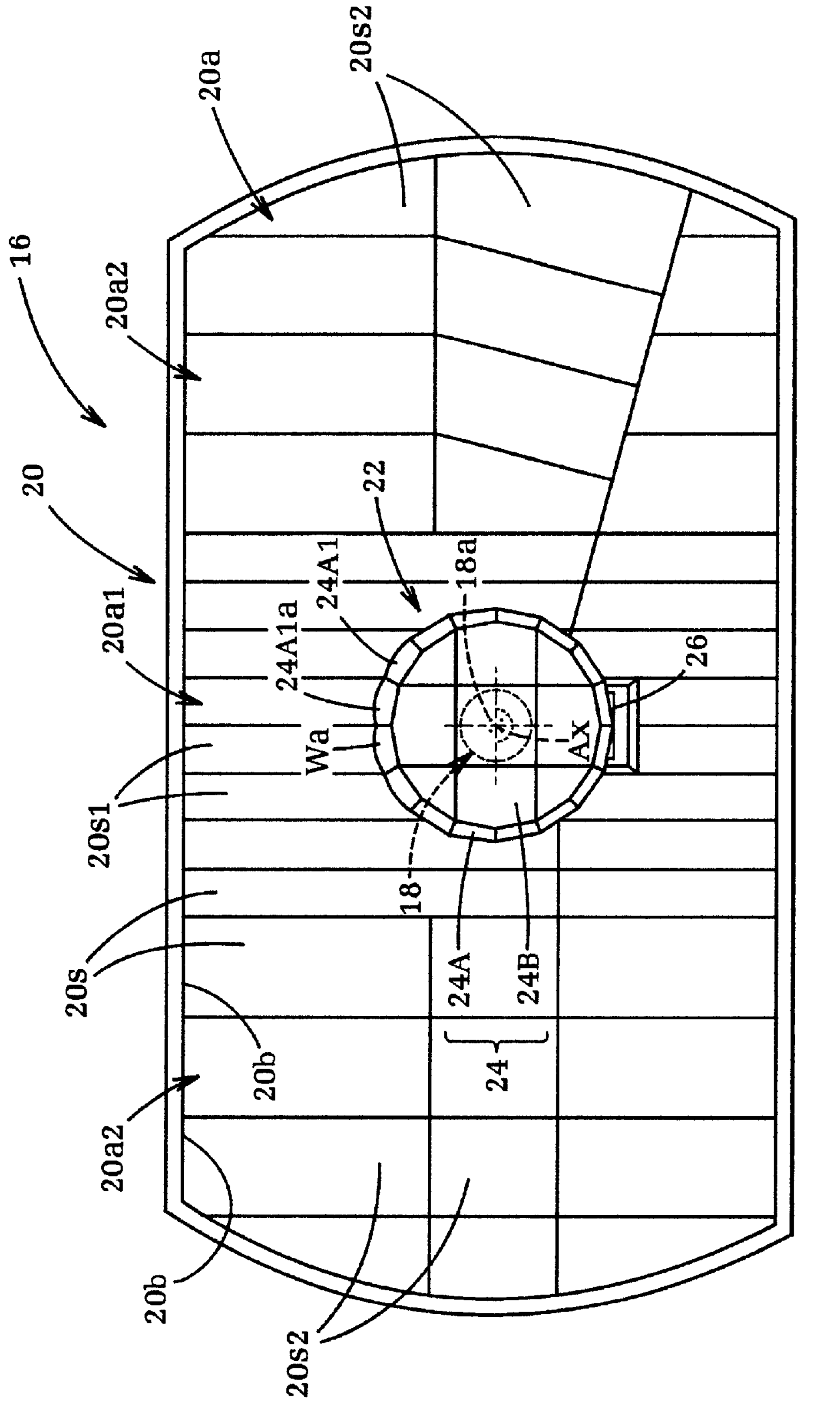
FIG. 2 is a view taken from the direction of the arrow II in FIG. 1.
Figure 4:
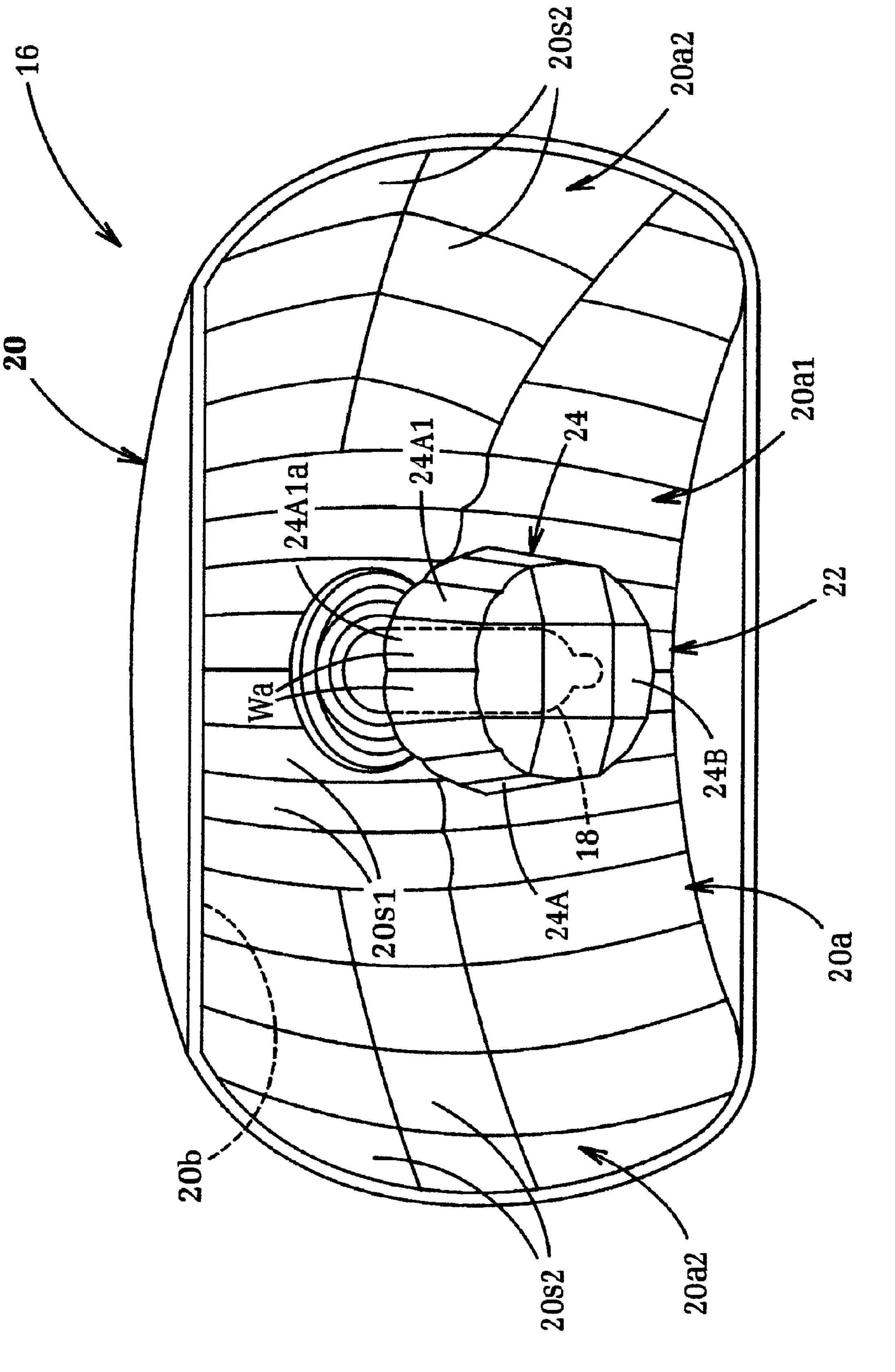
FIG. 4 is a perspective view of the reflector unit of the vehicle headlamp as viewed from the front above at a downward angle.
Figure 5:
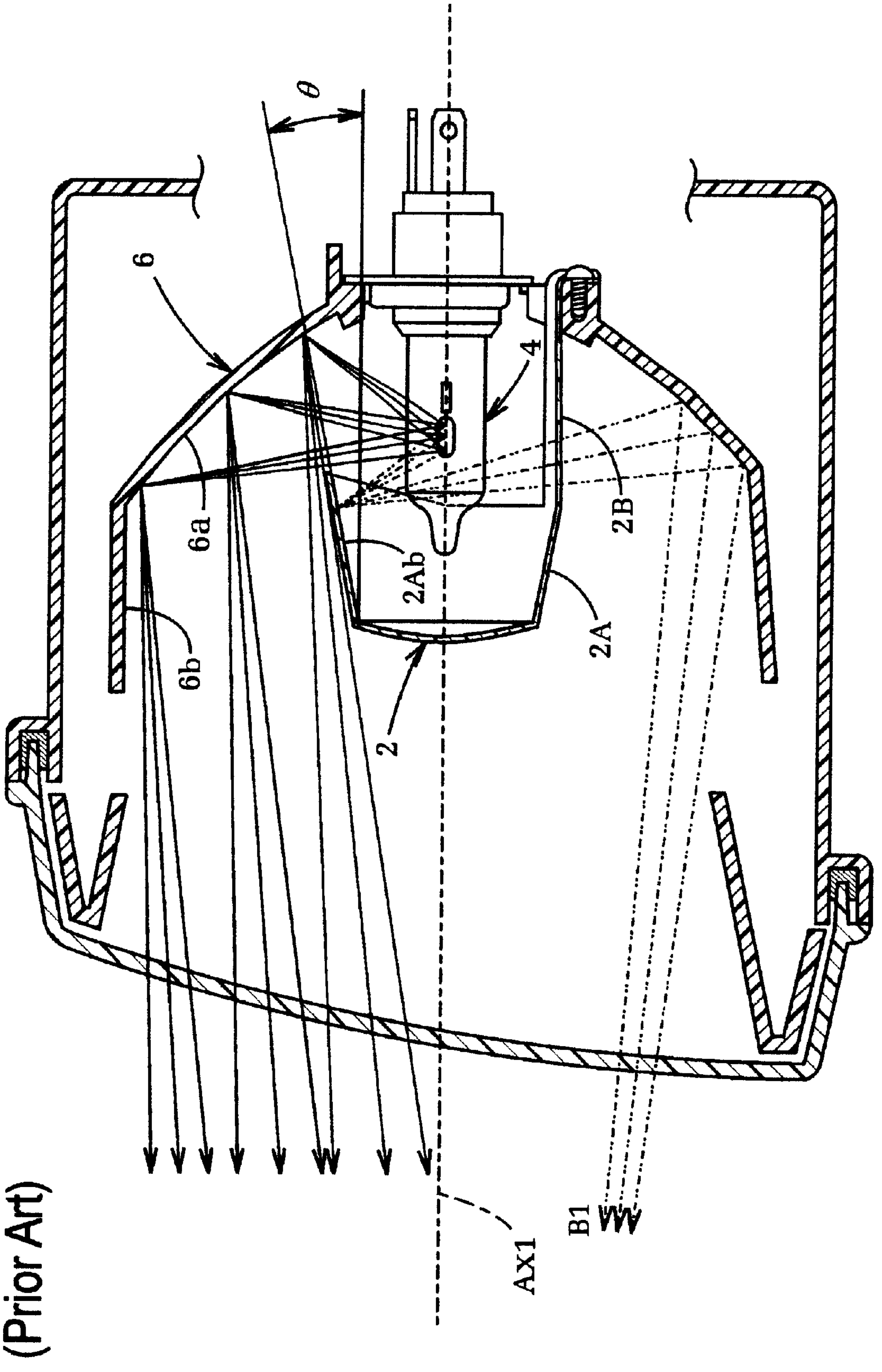
FIG. 5 (Prior Art)
FIG. 5 is a sectional side elevational view of an example of conventional headlamp.
Figure 6:
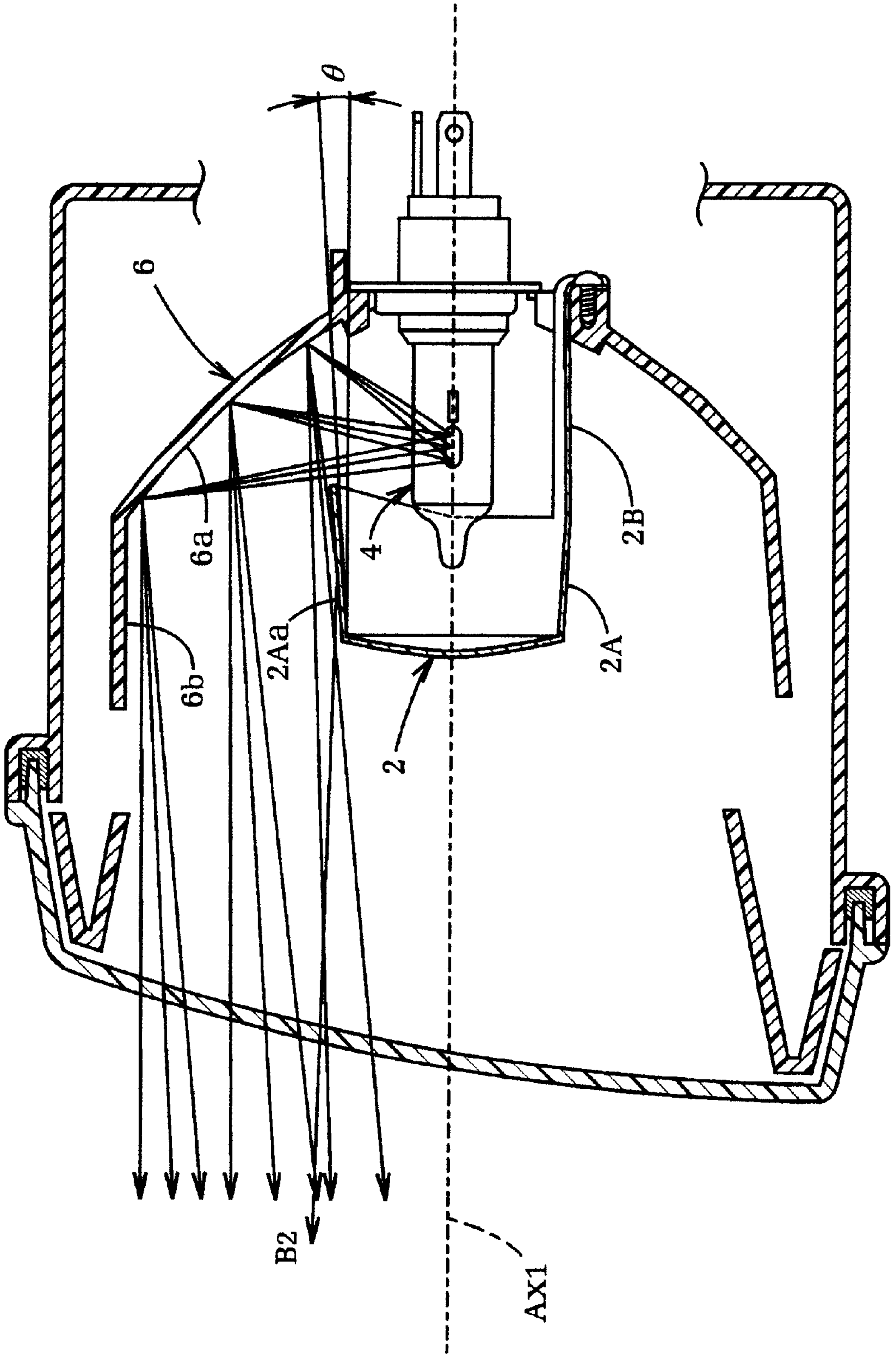
FIG. 6 is a sectional side elevational view of another example of conventional headlamp.

As shown in FIGS. 2 and 4, the reflective surface 20*a* of the reflector 20 is comprised of a center area 20*a*1, which is near the optical axis Ax, and a circumferential area 20*a*2, which is on the left and right sides of the center area 20*a*1. Wave-shaped reflecting elements 20*s*1 having a cross section divided like vertical stripes are formed on the center area 20*a*1. Reflecting elements 20*s*2 each having a lateral width broader than that of the wave-shaped reflecting elements 20*s*1 are formed on both circumferential areas 20*b*1.

The shade 22 is comprised of a cap-like shaped shade body 24 and a mount stay 26 that supports the shade body 24. The cap-like shaped shade body 24 and the mount stay 26 are integrally molded by press molding.

The shade body 24 comprises a cylindrical portion 24A and a front-end cover portion 24B. The cylindrical portion 24A surrounds the front end of the light source bulb 18 around the optical axis Ax like a cylinder, and the front-end cover portion 24B covers the front end portion of the cylindrical portion 24A. The shade body 24 blocks direct light rays directed to the fore of the lamp unit from the light source bulb 18 and those admitted to the upper wall surface 20*b* of the reflector 20. As best seen from FIG. 2, the cylindrical portion 24A has 16 surfaces about the optical axis Ax. As seen from FIG. 1, the rear expansion angle 2 with respect to the optical axis Ax of each of 16 surfaces is set to a small value, i.e., 7° or less (5°, for example).

The mount stay 26 extends rearward from the rear edge of the lower end of the cylindrical portion 24A of the shade body 24. The rear end portion of mount stay 26 is secured to the reflector 20 with a screw.

Figure 3:
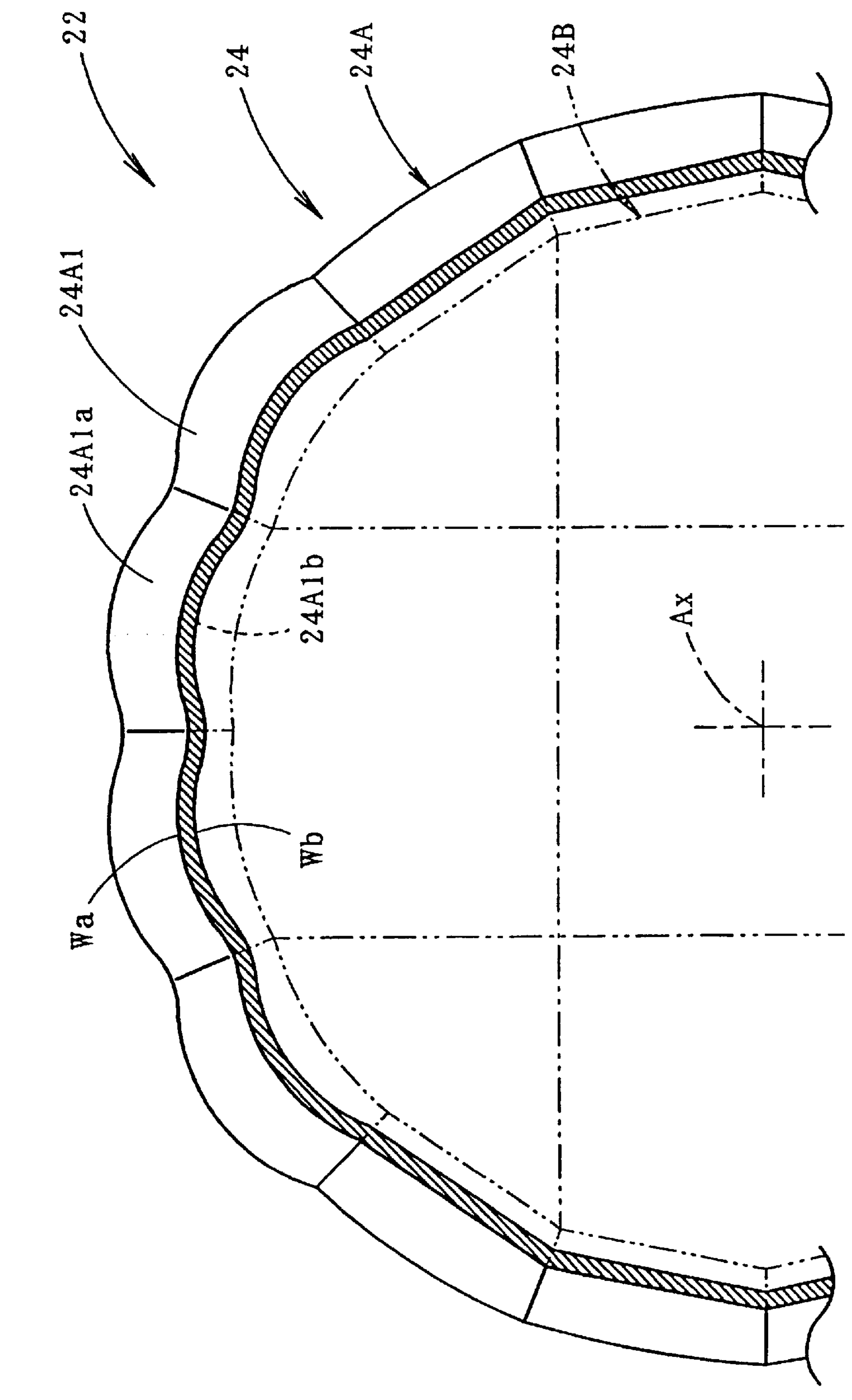
FIG. 3 is an enlarged sectional view taken along the line III—III in FIG. 1.

As shown in FIG. 3, the main portion of the cylindrical portion 24A of the shade body 24 has a polygonal cross section having 16 straight side surfaces of equal length. Of these 16 surfaces, each of the top four surfaces located in the upper portion 24A1 has a convex shape so that such four surfaces form a wave-like cross section that is shaped based upon the standard polygon having 16 equal straight sides. In other words, the upper outer circumferential surface 24A1*a* and the upper inner circumferential surface 24A1*b* of the cylindrical portion 24A of the shade 22 are formed as longitudinally striped wave-like surfaces Wa (corrugated diffusion portions) and Wb, both extending longitudinally in the direction of the optical axis Ax. These longitudinally striped wave-like surfaces Wa and Wb are formed in the area that is directly above the optical axis Ax for the angular range of 45° on the right and left sides.

As seen from the above, the vehicle headlamp 10 is provided with the shade 22 that blocks some of the direct light rays from the light source bulb 18. The cylindrical portion 24A of the shade body 24 of the shade 22 is formed so as to surround the front-end portion of the light source bulb 18 around the optical axis Ax like a cylinder. In addition, the longitudinally striped wave-like surface Wa is formed on the upper outer circumferential surface 24A1*a* of the cylindrical portion 24A so as to diffuse and reflect the incident light admitted onto the upper outer circumferential surface 24A1*a*. Accordingly, the shade has advantageous effects as described below.

Even if some of the reflected light from the reflective surface 20*a* of the reflector 20 is admitted to the upper outer circumferential surface 24A1*a* of the cylindrical portion 24A of the shade 22, the longitudinally striped wave-like surface Wa of the upper outer circumferential surface 24A1*a* diffuses and reflects such light into diffused light. As a result, the intensity of the light B (see FIG. 1) irradiated to the fore of the light bulb 18 and directed upward can be reduced to a substantially small value so as not to glare.

Though some of the reflected light from the reflective surface 20*a* of the reflector 20 is admitted to the upper outer circumferential surface 24A1*a* of the cylindrical portion 24A of the shade 22, almost no glare is likely to occur. Therefore, the rear expansion angle 2 of the cylindrical portion 24A does not have to be set to such a large value as in conventional art, and the degree of freedom in shaping the shade can be enhanced a corresponding amount.

The rear extension angle 2 of the cylindrical portion 24A of the shade 22 can be set to a small value. Therefore, the shade 22 can be formed so that the light from the light source bulb 18 and reflected on the upper inner circumferential surface 24A1*b* of the cylindrical portion 24A is prevented from being admitted to the lower area of the reflective surface 20*a* of the reflector 20 (or the quantity of light is minimized). As a result, the glare caused by the light reflected off of the inner surface of the shade 22 can be prevented without black paint on the inner surface of the cylindrical portion 24A. The cost of the shade 22 can be reduced accordingly by the amount corresponding to that saved by eliminating the black paint and its coating process.

As seen from the above, according to the present invention, a vehicle headlamp that has a shade can reduce the cost of the shade and improve the degree of freedom in the shaping thereof.

Furthermore, the rear expansion angle 2 of the cylindrical portion 24A of the shade is set to be a small value that is equal to or less than 7° with respect to the optical axis Ax. Accordingly, it is possible to effectively prevent incidence of reflected light from the upper inner circumferential surface 24A1*b* of the cylindrical portion 24A onto the lower area of the reflective surface 20*a* of the reflector 20.

In addition, the longitudinally striped wave-like surface Wa of the upper outer circumferential surface 24A1*a* of the cylindrical portion 24A of the shade 22 serves as the corrugated diffused portion that diffuses and reflects the light admitted to the upper outer circumferential surface 24A1*a*. Therefore, the corrugated diffused portion can be formed without deteriorating the press moldability of the shade.

With the longitudinally striped wave-like surface Wa thus structured as the corrugated diffusion portion, the upper inner circumferential surface 24A1*b* of the cylindrical portion 24A is formed by the vertical stripe wave-like surface Wb. The reflected light on the upper inner circumferential surface 24A1*b* can be thus formed into the diffusion reflected light. Accordingly, even if the light from the light source bulb 18 that is admitted to the upper inner circumferential surface 24A1*b* of the cylindrical portion 24A is admitted onto the lower area of the reflective surface 20*a* of the reflector 20 as diffused reflected light, the intensity of the light directed upward and is irradiated to the fore of the lamp unit from the lower area can be substantially small. Glare is thus effectively prevented.

In the shown embodiment, the wave-shaped reflecting elements 20*s*1 each having the shape similar to that of the longitudinally striped wave-like surface Wa of the shade 22 are formed in the center area 20*a*1 of the reflective surface 20*a* of the reflector 20. Accordingly, the unity of the lamp unit design can be improved.

Furthermore, the mount stay 26 of the shade 22 extends rearwards from the rear edge of the lower end of the cylindrical portion 24A of the shade body 24. The rear end portion of the mount stay 26 is secured to the reflector 20 with a screw. However, it is clearly understood that the structure of the mount stay 26 is not limited to the type described above so long as it supports the shade body 24.

In addition, the light source bulb 18 is an H4 type halogen lamp in the shown embodiment. The light source bulb 18 can be another type of halogen bulb or a discharge bulb, and the same advantageous effects as those of the described embodiment can be obtained.

The invention is described with reference to a headlamp that has a moveable reflector in which the reflector unit 16 is tiltably disposed in the lamp chamber defined by the lens 12 and the lamp body 14. However, the present invention can be applied to a headlamp in which the lens 12 and the reflector unit 16 are integrated and tilt as a single unit, i.e., a moveable unit type headlamp. Such a moveable unit type headlamp provides the same effects as those of the described embodiment.

What is claimed is:

1. A vehicle headlamp comprising a light source bulb installed on an optical axis that extends in a longitudinal direction of a vehicle, a reflector having a reflective surface for reflecting a light from said light source bulb forward, and a shade for blocking part of a light directly irradiated from said light source bulb, wherein:

said shade is comprised of a shade body;

said shade body has a surface which surrounds a front-end portion of said light source bulb about said optical axis and extends in a direction parallel to said optical axis;

a mount stay supports said shade body;

an outer circumferential surface of said shade body is provided with a corrugated diffusion portion formed thereon so as to diffusely reflect a light admitted thereto; and a surface shape of an area above said optical axis of said reflective surface of said reflector is formed so as to have substantially the same shape as said corrugated diffusion portion.

2. The vehicle headlamp according to claim 1, wherein an upper portion of said shade body is formed at a rear expansion angle of 7° or less with respect to said optical axis.

3. The vehicle headlamp according to claim 1, wherein said corrugated diffusion portion comprises a longitudinally striped wave-like surface having a wave-like shape in cross section perpendicular to said optical axis.

4. The vehicle headlamp comprising a light source bulb installed on an optical axis that extends in a longitudinal direction of a vehicle, a reflector having a reflective surface for reflecting a light from said light source bulb forward, and a shade for blocking part of a light directly irradiated from said light source bulb, wherein:

said shade is comprised of a shade body that surrounds a front-end portion of said light source bulb around said optical axis and a mount stay that supports said shade body;

an outer circumferential surface of said shade body is provided with a corrugated diffusion portion formed thereon so as to diffusely reflect a light admitted thereto; and a surface shape of an area above said optical axis on said reflective surface of said reflector is formed so as to have substantially the same shape as said corrugated diffusion portion.

5. The vehicle headlamp according to claim 4, wherein a surface shape of an area above said optical axis on said reflective surface of said reflector is formed so to have substantially the same shape as said corrugated diffusion portion.

6. The vehicle headlamp comprising a light source bulb installed on an optical axis that extends in a longitudinal direction of a vehicle, a reflector having a reflective surface for reflecting a light from said light source bulb forward, and a shade for blocking part of a light directly irradiated from said light source bulb, wherein:

said shade is comprised of a shade body that surrounds a front-end portion of said light source bulb around said optical axis and a mount stay that supports said shade body;

an outer circumferential surface of said shade body is provided with a corrugated diffusion portion formed thereon so as to diffusely reflect a light admitted thereto;

said corrugated diffusion portion comprises a longitudinally striped wave-like surface having a wave-like shape in cross-section perpendicular to said optical axis; and a surface shape of an area above said optical axis on said reflective surface of said reflector is formed so as to have substantially the same shape as said corrugated diffusion portion.

* * * * *